(12) United States Patent
Donnelly

(10) Patent No.: US 7,088,816 B2
(45) Date of Patent: Aug. 8, 2006

(54) SYSTEM AND METHOD FOR CUSTOMISING CALL ALERTS

(75) Inventor: Peter G Donnelly, Yarraville (AU)

(73) Assignee: Redpoint Pty Ltd., Yarraville (AU)

( * ) Notice: Subject to any disclaimer, the term of this patent is extended or adjusted under 35 U.S.C. 154(b) by 0 days.

(21) Appl. No.: 10/772,403

(22) Filed: Feb. 6, 2004

(65) Prior Publication Data

US 2004/0223605 A1   Nov. 11, 2004

Related U.S. Application Data

(63) Continuation of application No. PCT/AU02/00390, filed on Mar. 28, 2002.

(30) Foreign Application Priority Data

Aug. 10, 2001   (AU) .................................. PR6907

(51) Int. Cl.
*H04M 1/00*   (2006.01)
(52) U.S. Cl. ........................... 379/373.01; 379/373.02; 379/373.04; 379/142.04
(58) Field of Classification Search ........... 379/373.01, 379/373.02, 373.04, 142.04
See application file for complete search history.

(56) References Cited

U.S. PATENT DOCUMENTS

| 5,889,852 A | 3/1999 | Rosecrans et al. |
| 5,999,599 A | 12/1999 | Shaffer et al. |
| 6,160,489 A | 12/2000 | Perry et al. |

FOREIGN PATENT DOCUMENTS

| EP | 0 741 484 A | 11/1996 |
| WO | WO 99/25107 A | 5/1999 |
| WO | WO 01/41405 A | 6/2001 |

*Primary Examiner*—Jefferey F. Harold
(74) *Attorney, Agent, or Firm*—Oliff & Berridge, PLC

(57) ABSTRACT

A computerized system and method for selecting the nature and/or form of an alert used to announce a call made by a user participating in a customized alter service. The method includes establishing a customized alert service configuration for a participating user, which configuration is then stored on one or more network accessible devices. The participating user uses a first communications terminal to make a call to a second communications terminal, via a first communications service, the second communication terminal then announces the call by activating an alert using a chosen alert descriptor which has been chosen according to the customized alert service configuration for the participating user.

32 Claims, 4 Drawing Sheets

SYSTEM AND METHOD FOR CUSTOMISING CALL ALERTS

FIELD OF INVENTION

The present invention relates to a method and system for enabling a user of a communications terminal ('calling terminal') or communications service ('calling service') to select the form and/or nature of an alert used to announce a call to a second communications terminal ('called terminal') or communications service ('called service'). The present invention relates particularly, but not exclusively, to a method and system whereby an alert used by a called terminal to announce an incoming call is determined, or otherwise controlled, as a consequence of interpretation of information by a computerised system, wherein the information is provided by the calling terminal user or calling service subscriber or person acting on their behalf.

BACKGROUND OF INVENTION

Many current telephone handsets, particularly mobile telephone handsets, allow a user to select an alert tone sequence to be used to alert the user to incoming calls. As an example, a mobile telephone handset user may be able to choose a preferred alert tone sequence from a range of alert tone sequences stored within a mobile telephone handset's non-volatile memory. Some mobile telephone handsets additionally allow the user to procure and install additional alert tone sequences using the handset's cable or the handset's 'air' interface.

Furthermore, some telephone handsets may also offer additional functionality, for example, allowing a user to select and assign particular alert tone sequences to incoming calls from a particular individual or group of individuals. Typically, the telephone handset uses a network provided capability, such as Calling Line Number Identification (CLID), to determine the number of the calling party which is then associated with a pre-selected alert tone sequence. Associating an alert tone sequence with a particular CLID may provide a called terminal user with an early audio warning should a particular person or category of person happen to phone.

Whilst providing a useful capability, it appears that present customisable call alert systems have a number of limitations.

Firstly, it appears that existing customisable call alert systems provide a scheme in which only the called party is able to determine how a calling party will be announced. Thus, a calling party is unable to choose how their calls will be announced to those they call.

If a calling party was able to choose how they will be announced to a called party then the calling party might choose to be announced by an alert which was customised in some way to suit, for example, the calling party's personality, job, hobby or tastes inter alia. Such a 'customised alert' might also convey, for example, emotion (for example, joy, whimsy, anger or urgency) in addition to information (for example, 'sounds like John the Builder calling'). Furthermore, a calling party might choose to have a repertoire of such customised alerts at their disposal so that their calls are announced by a customised alert appropriate to the time of day, or person called, or type of person called, or country called, or at random or otherwise as they see fit.

A second limitation of present customisable call alert systems is that they appear to support only audio based alerts. Telephone handsets are often equipped with a range of software controllable outputs including speakers, vibrators, graphical screens and light emitting devices any or all of which could also participate in the incoming call alert process.

Thirdly, existing systems often use CLID to identify pending callers, however not all networks provide CLID, and, furthermore, only some jurisdictions permit its use, and furthermore, even where CLID is nominally available, CLID information is not always able to traverse multiple operators' networks successfully. Hence, customisable call alert systems which depends solely on CLID for identifying incoming calls have practical limitations.

Lastly, CLID is typically not able to be used where the calling party has an unlisted ('silent', 'ex-directory') telephone number. However, in these cases, although a calling party may not wish their phone number to be transmitted when making a telephone call, they may be happy to be identified by other, less privacy threatening means. In particular, they may be happy to have their telephone number utilised as a part of a process which is used to select the nature of the alert used to announce their call(s) provided their telephone number is not made available to the called party's communications terminal.

It is an aim of the present invention to provide a customisable call alert system which overcomes at least some of the limitations of the existing call alert systems.

SUMMARY OF THE INVENTION

In general terms, the present invention is directed to a system for, and method of, activating an alert on a communications terminal which has been called by a system user, wherein the activated alert is selected or otherwise controlled in accordance with preferences of the system user.

According to a first aspect of the present invention, there is provided a method for selecting the nature and/or form of an alert used to announce a call made by a user participating in a customised alert service, the method including:

a. establishing a customised alert service configuration for a participating user, the customised alert service configuration being stored on one or more network accessible devices;

b. the participating user using a first communications terminal to make a call to a second communications terminal, the call being supported by a first communications service; and c. the second communications terminal announcing the call by activating an alert using a chosen alert descriptor;

wherein the alert descriptor is chosen according to the customised alert service configuration for the participating user.

A "communications terminal" may be any suitable type of communications terminal. It may be a terminal specifically designed for the purposes of the present invention, or, it may be a commonly available terminal such as a telephone handset or cellular mobile handset. It may be implemented in hardware or software or both hardware and software. In this respect, it should be understood that PC based communications programs such as 'soft phones', or video conferencing clients or instant messaging clients, inter alia, are all examples of communications terminals.

According to a second aspect of the invention, there is provided a computerised system for enabling the nature and/or form of an alert used to announce a call made by a user participating in the system to a communications terminal participating in the system to be determined in accordance with the participating user's preferences, including:
a. a plurality of communications terminals, at least some of which are capable of receiving and acting on an alert descriptor(s) and calls associated with alert descriptor(s);
b. a data entry device for creating a customised alert service for a participating user;
c. configuration software for configuring the participating user's customised alert service, the configuring of the participating user's customised alert service including selecting and/or providing at least one alert descriptor for use with the participating user's customised alert service;
d. a database for storing the participating user's customised alert service configuration;
e. processing means for choosing an alert descriptor for use with the call made by the participating user to a receiving communications terminal; and
f. means of communicating alert descriptors to the receiving communications terminal;

wherein the chosen alert descriptor is selected in accordance with the configuration of the participating user's customised alert service.

GENERAL DESCRIPTION OF THE INVENTION

Reference to the term 'entity participating in the call setup process' throughout this specification is to be understood to be reference to a communications system element involved in the establishment of a call, such as processing logic associated with a CO switch or MSC or VoIP system or a component of an IN or AIN or 'Parlay' system or a SIP client or SIP server or SIP proxy or a Call State Control Functions (CSCF).

Reference to the term 'alert' throughout this specification is to be understood to be reference to a human sensible emission, emitted by a terminal, whose primary purpose is to draw the attention of a called party to an incoming call. Furthermore, reference to the term 'alert descriptor' throughout this specification is to be understood to be reference to a digital encoded representation of an alert. It is to be understood that in addition to embodying features designed to draw the attention of a called party to an incoming call, an alert may additionally embody features which are directed towards secondary ends such as to entertain, or inform or advertise inter-alia.

In a particular embodiment of the invention, the means for storing a participating user's customised alert service configuration and the processing means for choosing an alert descriptor associated with the participating user's customised alert service may be provided by an alert server, either alone or in conjunction with or as a component of a customised alert management system. In this respect, reference to the term 'alert server' throughout this specification is to be understood to be reference to a network accessible programmed computer which is able to store a participating user's customised alert service configuration.

In a preferred form of the invention, a customised alert service may be configured by, or on behalf of, a participating user.

Pursuant to a preferred embodiment of the present invention the configuration of a participating user's customised alert service may include selecting and/or providing ancillary information. In this respect, reference to the term 'ancillary information' throughout this specification is to be understood to be reference to information (for example, rules or preferences) provided by, or on behalf of, a participating user, which may assist an alert server or customised alert management system or communications terminal in determining the preferred circumstances under which an alert descriptor should be used. In this preferred form of the invention, an alert descriptor is able to be selected using information drawn from the ancillary information associated with the participating user.

For the purposes of this description, a "communications terminal" is generally a terminal such as a telephone handset, SIP Phone, cellular mobile handset, videophone or personal computer application program capable of setting up calls and which is a participant in a customised alert system. A communications terminal may have additional functionality over and above functionality it may have were it a terminal not associated with a customised alert system. In this respect, a communications terminal may be able to receive and store alert descriptors, correctly act upon incoming calls which are associated with alert descriptors, and process particular alert descriptors of supported format(s), category(ies), or class(es) so as to reproduce, though not necessarily with perfect or originally envisaged fidelity, alerts represented by alert descriptors.

On the other hand, the present invention in its preferred embodiments will operate in a co-operative manner with communications equipment which does not have the capabilities necessary for customised alerts. For example, when an unsophisticated telephone handset which cannot handle customised alerts receives a call specifying a customised alert, the handset preferably rings in the normal manner. Furthermore, a system according to the invention preferably allows a call with a customised alert to be initiated from a communications terminal such as a telephone handset which does not itself have the ability to receive customised alerts. In this respect, where 'backward compatibility' with existing communications terminal populations is necessary, then the customised alert system or component(s) thereof may temporarily disable customised alert system related features and interact with non-participating communications terminals in the manner required were a customised alert system not present. Alternatively or additionally, a customised alert system may be designed so as to be not visible to non-participating terminals.

Each communications terminal will preferably include:
a. programmatic software and data to enable it to identify incoming calls which are associated with a customised alert
b. programmatic software and data to enable it to request and retrieve alert descriptors from an alert server and/or programmatic software and data that enables it to accept customised alert descriptors offered to it by an alert server;
c. additional software and/or hardware which may be required to allow it to correctly act upon (for example, decode and reproduce an encoded alert) alert descriptors intended or required to be supported; and
d. programmatic software and data and sufficient memory to enable it to locally index, store, manage and retrieve alert descriptors Communications terminals may be designed or configured so as to act upon any alert descriptor that they have the ability to interpret and act upon. Alternatively, communications terminals may be constrained to act upon a particular class (or classes) of alert descriptor. The particular class or classes may be defined in accordance with a constraint (or constraints) which specify type of alert descriptor (for example, only handle audio alert descriptors), format of alert descriptor (for example, only handle MPEG3 alert descriptors) and/or origin of alert descriptor. For example, a communications terminal may be constrained to act upon only alert descriptors associated with a particular customised alert management system(s), or particular telephone company (ies), or Internet service provider(s), or applications service provider(s), or other kind of service provider or grouping of service providers. The constraint(s) may represent the expressed preferences of participating users or customised alert management system owners (or operators) or both.

In particular embodiments of the present invention, a communications terminal may include additional sub-systems. For example, a communications terminal may include a subsystem, or subsystems, which enable it to perform some, or all, of the following functions:

a. alert server functions;
b. customised alert management system functions; and
c. alert descriptor design/creation/development functions.

The incorporation of additional functionality, in a communications terminal, may allow, inter-alia, for implementations of customised alert systems wherein all necessary functionality of a customised alert system is able to be contained within the communications terminals.

Although reference has been made to an association between a communications terminal and a customised alert system, the association need not be an exclusive one. Indeed, communications terminals may be able to participate in or inter-operate with multiple customised alert systems concurrently.

With reference now to alert descriptors, for the purposes of this invention, an alert descriptor is a digital encoded representation of an alert, such that an alert descriptor is encoded in some format which may be utilised by communications terminals and consisting, when correctly decoded, of information sufficient to enable a suitably equipped communications terminal to give effect to the alert so represented. In this respect, an alert descriptor may encode or specify sound, still or moving images, or other forms of multimedia, or a combination thereof, and may further encode information specifying the timing and order in which alert descriptor sub-components should be 'played out' and the output devices to which alert descriptor sub-components should be applied and may further encode information identifying the calling terminal(s) or calling user(s) or calling communications service(s) to which the encoded alert applies.

An example of a simple alert descriptor is a coded bit-stream, which may be decoded by a called terminal, representing an audio waveform together with the instruction that the called terminal should announce the associated incoming call by playing the corresponding alert repeatedly through an appropriate or specified audio output device. The audio 'content' of such a customised alert may be provided in some well known audio format such as 'MIDI', WAV, MP3 or in some other suitable format, whether standards based or proprietary. In the context of this invention, communications terminals are preferably able to make use of alert descriptors to control or modulate one, a plurality or all of their controllable output devices in order to announce a pending call.

Examples of suitable controllable output devices include:
a. controllable output devices capable of emitting audio signals (for example, speakers and buzzers);
b. controllable output devices capable of emitting or selectively reflecting electromagnetic radiation (for example, phone or computer or 'Personal Digital Assistant' displays of any type, lamps, light emitting diodes);
c. controllable output devices capable of mechanical movement (for example, vibrators, mechanical arms); and
d. controllable output devices capable of emitting odours.

An alert descriptor may be associated with ancillary information defined which is able to be used by a called terminal to determine how or when to make use of an alert, or by an alert server to determine which of a plurality of alerts associated with a system subscriber or user to provide to a called terminal for use in conjunction with a call. Further, alert descriptors may, or may not, be associated with names or identifiers or labels.

In a preferred form of the present invention, the alert descriptor used to reproduce an alert by a called terminal for a call may be determined in response to computerised processing of ancillary information associated with the alert descriptor or service. In a preferred embodiment of the present invention, the determined alert may correspond to the time at which the call is made, or other circumstances, and possibly additionally depend on the particular person or class of person being called. In this respect, the determination of the correct (or most appropriate) alert to be used for a particular call may be determined through the processing of ancillary information by logic associated with an alert server, or called terminal, whereby the alert to be used is, preferably, a function of 'who' is calling (for example, the calling terminal or calling user), and/or 'who' is being called (for example the called terminal or called party), and/or 'other' variables.

A particular implementation of the system may not take advantage of the full generality offered by the present invention. In this respect, the complexity of the logic used to select an alert may be simplified in a partial implementation of the preferred invention. For example, the alert to be used may be a function of 'who' is calling and other variables. Alternatively, the alert to be used may simply be a function of is 'who' is calling.

The following description provides examples of 'other' variables which may be taken into account, either individually or in combination, during the process by which an alert for use with a particular call is determined.

(a) Temporal Variables

Where the alert to be used is dependent upon the value of a time related variable that applies at the calling party's location or the called party's location or both calling and called party's locations or some other location. Examples of temporal variables include:

(i.) time of day (for example, use a particular alert between 0800 and 1800 as indicated in the time zone of the called party);
(ii.) day of week; and
(iii.) 'weekday/week-end status' (for example, use a particular Alert on weekends).

(b) Seasonal and Cultural Variables

Where the alert to be used is dependent upon the value of some 'cultural' variable that applies at the calling party's location or the called party's location). Examples of cultural variables include:

(i.) current season (for example, Summer, Winter, Autumn/Fall, Spring);
(ii.) public, special or religious holiday (for example, Easter);
(iii.) a special event (for example, for the duration of the 2004 Olympic Games); and
(iv.) for the duration of some event of interest.

(c) Geographic Variables

Where the alert to be used is dependent on the absolute or relative location of the called party, calling party's end or both parties. Examples of geographic variables include:
  (i.) location (for example, City, Region, State, Country); and
  (ii.) geographic co-ordinates (for example, latitude, longitude, height, distance from some known place or point.).

(d) Proximity Variables

Where the alert to be used is dependent on the relative proximity of the called and calling parties. For example, an alert that mimics a Geiger counter, clicking more frequently when the called party and the calling party are closer together than when they are further apart.

(e) Personal Variables

Where the alert to be used depends on the value of some 'personal' variable that applies to the calling party or the called party or both parties or some other Party. For example, age, star sign, gender, favourite colour, favourite number.

Any, or all, of the variables presented above could be associated with either the called party, or the calling party or both parties depending on the objectives of a particular system of the present invention and availability of information that would allow variables to be determined.

For explanatory purposes, the following examples provide descriptions of possible applications for variables in determining a call alert for use with a call.

(a) Astrological Compatibility

In this example, an alert activated at the called terminal produces may be dependant upon an assessment of the 'astrological compatibility' of the calling and called party, as deduced from 'astrological data' (for example, star signs) previously provided as a part of a subscription process provided by both called and calling parties.

(b) Affiliation

In this example, an alert used to announce a call from a caller located in the United States to an overseas number may be selected from one of a series of US themes and icons (for example, Star Spangled Banner, America the Beautiful, and the Statue of Liberty). The caller may be able to request that one theme always be used, or alternatively, that the system select a theme at random, or in sequence, for calls made by the caller. Furthermore, a similar service may also be provided which may be based on city, or sports team affiliation or some other form of affiliation.

(c) Socially Aware

In this example, an alert used to announce a call from a participating caller may be one of a series based on social and environmental causes. Furthermore, a selected alert may make use of images and sounds associated with the selected set (for example, 'Save Rainforests' alerts may make use of real time data or images of actual rainforests).

(d) Product/Service Promotion

In this example, an alert used to announce a call from a participating caller may be commercially sponsored and used to promote a particular commercial enterprise, service or product. Here, a commercial sponsor may potentially pay an amount of money per successful call to a customised alert service provider and perhaps also to participating callers who adopt their alert, perhaps on a per successful call basis.

In light of the preceding examples, it will be thus appreciated that, depending on the objectives of a particular system of the present invention, the determination of an alert (via the selection of the appropriate alert descriptor for use with a given call) using a computerised process may be relatively simple. For example, the evaluation of a single variable followed by selection of the alert that corresponds to the value of the evaluated variable. In other cases, the determination of variables and selection of an alert may be relatively complex, requiring for example, the execution of a complex algorithm involving the retrieval and evaluation of multiple variables and possibly also other information drawn from local and/or remote sources.

Having described alert descriptors and communications terminals, the customised alert management system will now be described.

According to a preferred embodiment of the invention the customised alert system is able to be administered by a customised alert management system. Preferably, the customised alert management system will be a computerised system which may include one or more networked computers or computing devices with sufficient aggregate processing power and storage capacity to operate required application software, databases and support software. In this respect, the customised alert management system may also have sufficient logical associations with entities participating in the call setup process and sufficient network connectivity to allow alert descriptors and related information to be distributed to communications terminals in accordance with an alert descriptor processing mechanism or mechanisms chosen for a particular customised alert system implementation.

A customised alert management system need not be implemented on dedicated hardware. Indeed, a customised alert management system may be implemented on hardware which also implements other customised alert system functionality (such as hardware which implements a communications terminal) or other functionality not associated with a customised alert system. Further, a customised alert management system may share hardware or software resources with other components of a customised alert system.

A customised alert management system need not be monolithic but rather may be a distributed entity. In this respect, components of a customised alert system need not be physically co-located, but rather may be located in a plurality of locations and communicate with each other by means of data links, communications network(s) or communications inter-networks sufficient to carry out their respective role or roles. A customised alert management system need not be owned or controlled or managed by a single person or legal entity.

The precise capabilities of a particular customised alert management system may depend somewhat on the scope, objectives and manner of implementation of the customised alert system. In this respect, a particular customised alert system design may support particular processes which facilitate the inventive method.

In a simplistic analysis, the process involved in the method of the present invention can be described in terms of two main sub-processes:
(a) subscription sub-process; and
(b) call sub-process.

The subscription sub-process is that process of the method of the invention which enables a user or subscriber to select or provide an alert descriptor, or alert descriptors, for future use by communications terminals when announcing calls from a communications service or services designated by the user or subscriber.

The call sub-process is that process of the method of invention during which an alert descriptor, or alert descriptors, are distributed to and perhaps utilised by a communications terminal.

According to the method of the present invention, the subscription sub-process precedes and is a prerequisite to the call sub-process.

Preferably, during the subscription sub-process a user interacts with the customised alert management system using an interactive medium, such as via a computing device connected to the Internet or, indeed, using any suitably equipped communications terminal.

User interaction with the customised alert management system may be subject to the customised alert management system performing suitable processes to authenticate the identity of a user. In this respect, the customised alert management systems will preferably perform a credentials verification process, or processes, to verify whether or not a user is authorised to carry out the functions they seek-to carry out.

The credential checking process may include interaction with a database, or databases, associated with a specified communications service(s) and/or communications terminal(s). In one preferred form of the invention the customised alert management system is able to interact with a database, or databases, perhaps owned or controlled by other another entity, or entities, such as a telephone company or Internet service provider or applications service provider or some other service provider for the purpose of credentials checking.

Pursuant to the preferred embodiment of the invention, once access to the customised alert management system has been established, a user is able to select, by means of some interactive selection process, or by some other suitable means, an alert or alerts, and is able to associate selected alert(s) with one or more communications terminals or services from which the user expects to originate calls such as telephone service(s) or desktop video service(s) or multi-player gaming service(s) or 'instant messenger' service(s)). The selected alerts may subsequently be used by a communication terminal to announce calls made to the communication terminals by the user.

In a preferred embodiment of the present invention, the alert selection process provides a user with the ability to select from a range of pre-existing alerts made available by the customised alert management system. Ideally, the present invention also provides a user with the capability to provide an alert or alerts, in the form of an alert descriptor(s), to the customised alert management system, by means of an upload process or by some other suitable means. In this respect, alert descriptors so provided by a user may have been self-developed by or on behalf of the user or else sourced from a $3^{rd}$ party location such as a web site or indeed a specialised 'Alert Portal' web site.

In a preferred embodiment of the present invention, the customised alert management system preferably also allows a user to supply by means of an interactive selection, or upload process, ancillary information for use by the customised alert management system to assist it in determining the preferred circumstances under which an alert descriptor, or alert descriptors, should be used. Advantageously, the customised alert management system is able to forward some or all of the ancillary information to other participating entities, such as communications terminals, to enable other participating entities to determine when and/or how selected, specified, or provided, alert descriptors, or descriptors, should be used.

In a preferred embodiment of the present invention, a user may also be able to select a pre-existing alert repertoire from a set of available repertoires, each comprising one or more alerts which adhere to a particular theme or category. Alerts drawn from the selected theme or category may then be used to announce calls from the user, perhaps changing at random or cyclically from call to call and/or from time to time. For example, such themes might include, 'clean and green', 'Jesus saves', 'Adidas', 'Coca Cola', 'Fox Movies', 'Sony Top Twenty Ringtones', 'rainforests', 'surfin USA', 'cat lover'.

In a particularly simple embodiment of present invention, a user may select an alert using a touch tone (DTMF tone) capable telephone handset. In this regard, a user may select an alert using keystrokes corresponding to numbers or number words which identify a particular alert to the customised alert management system. Alternatively, in a more user friendly version of this particularly simple embodiment, the customised alert management system may play an alert or a sequence of alerts to the user through the audio output device of a DTMF capable telephone handset and the user indicate by means of a keystroke or keystroke sequence that they wish to adopt the alert currently being played.

Preferably, the customised alert management system establishes sufficient associations between selected alerts, user entered parameters, subscribers, users, services, communications terminals and other necessary information to enable the customised alert management system to perform operational functions including, inter-alia and in particular, distribution of alerts to entities participating in a call setup process and/or communications terminals as and when they are required by communications terminals to perform their role within a customised alert system. In this respect, the customised alert management system preferably stores the relevant information and associations in a suitable database, or databases.

Distribution of alert descriptor(s) and ancillary information to communications terminals may occur prior to, during, or subsequent to the call set-up process for a particular call. In this respect, the timing of alert distribution will depend on which of the multiple options described as a part of the inventive method herein have been implemented in a given system, and perhaps also on the operational circumstances prevailing at the time of call set, including for example the capabilities of communications terminals and underlying networks, network latency(ies) and communications terminal capabilities.

With reference now to the call sub-process, the implementation of the call sub-process may be dependent upon the customised alert system design. A system using the method of invention may support one or both of two different implementations, namely:

(a) 'Alert Fetch';

(b) 'Alert Push'.

According to the inventive method, in a customised alert system which supports the 'Alert Fetch' sub-process, alert related processing is temporally associated with call setup and functionally associated with the called terminal. In this regard, during the call set-up process, and ideally during call setup signaling, the called terminal is made aware that, or else determines that, or else assumes that, the calling terminal or calling user or calling communications service is associated with a customised alert system and that an alert descriptor is or may be available for use with this call. Further, an alert descriptor or descriptor may be provided to the called terminal for use with the call Alternatively, the called terminal itself, using information provided to it during call setup, may locate and retrieve the appropriate alert descriptor(s) from an alert server.

In a preferred form of the system of the present invention using the 'Alert Fetch' call sub-process, the call sub-process includes the steps of:.
1. Calling party attempts to set up a call to called party's terminal (for example, in a telephony scenario—by dialing appropriate telephone number and pressing 'Send' button or equivalent; or in a session based Instant Messaging Scenario, by selecting a representation of a 'buddy' and indicating the desire to chat through some interaction with the messaging client).
2. Request for call establishment received by called terminal (for example, in a telephony scenario—call setup request signaling to called terminal from entity participating in the call setup process).
3. Notification to, or determination by, or assumption by the called terminal that an alert descriptor is, or may be available for Use with this call (for example by inspection of CLID or extraction of URL from SIP Alert-Info header).
4. (Where required) determination of location from which alert descriptor may be retrieved by called terminal. Location may be remote (e.g. alert server) or local (e.g. in cache).
5. (Where required) retrieval of alert descriptor from alert server by called terminal and local caching of same.
6. (Where alert descriptor is able to be retrieved from cache, or where it is able to be retrieved 'sufficiently quickly' as defined by a configurable local or system wide time parameter). Utilisation of the alert descriptor by called terminal to reproduce encoded alert and thereby announce incoming call with customised alert.
7. (Where no alert descriptor is available for the call). Announcement of the call using normal alert (alert that would be used were there no customised alert system).

It is to be understood that many variations of the steps presented above are possible. In a customised alert system which supports the 'Alert Fetch' sub-process, one or more entities participating in the call setup process and associated with the calling terminal or service may be active components in the customised alert system, and one or more of these may incorporate or be associated with processing logic which associates calling terminal identifiers (or calling service identifiers) with alert system participation (that is, 'know' which of its associated terminals or communications services presently participate in the customised alert system). In this respect, in one particular scenario, such an entity may inform a customised alert management system that a calling terminal or communications service is initiating a call and may further provide the customised alert management system with information (for example, calling service telephone number or some other suitable identifier and called service telephone number or some other suitable identifier) which the customised alert management system may then use to identify and/or locate and/or retrieve alert descriptor(s) and possibly also ancillary information for use with the call. Further, the customised alert management system may provide alert descriptor(s) or information sufficient to identify alert descriptor(s) and possibly also ancillary information so retrieved together with information identifying the called terminal or service to one or more entities participating in the call setup process and associated with the called terminal or communication service Such an entity or entities may subsequently inform the called terminal that an alert descriptor is available for use with an incoming call and may also provide the called terminal with the identifying name or label or identifier of said alert descriptor to be used with the incoming call and may also provide the called terminal with information such as network address information to assist the called terminal in locating and retrieving the alert descriptor to be preferentially used to announce the call such as network address information and may also provide the called terminal with the alert descriptor to be preferentially used to announce the call.

Where advantageous, alert related communications dialogue may take advantage of recognised signaling protocols and architectures (for example, AIN, IN, SS7, Parlay, JAIN, JAIN SIP Servlet API; INAP, TCAP, MAP, TUP, ISUP IETF SIP. In this regard, available options will depend somewhat on the scope, objectives and manner of implementation of the customised alert system as well as the nature and capabilities of underlying network(s), communications services and participating terminals.

Further, where alert related communications dialogue is required to traverse the PSTN or PLMN and the Internet or other IP network, such dialogue may take advantage of architectures and protocols designed to facilitate PSTN/PLMN to IP network inter-working such IETF PINT ('PSTN and IN Internetworking'), SPIRITS ('Service in the PSTN/IN Requesting Internet Service'), SIGTRAN (Signaling Transport), MGCP (Media Gateway Control Protocol), MegaCo ('Media Gateway Control' protocol) and enum (Telephone Number Mapping).

It is to be understood that the calling terminal or communications service and called terminal or communications service need not be associated with (or 'homed to') a single network operator.

The form and nature of the alert related information provided to the called terminal may vary from implementation to implementation but may include:
(a) affirmation that the calling terminal or calling service is a participant in a (default or specified) customised alert system if this is the case;
(b) network name(s) or network address(es) of suggested alert server(s) which may possess the required alert descriptor(s) for use with the call;
  alternatively, or in addition, this information may have been loaded into the called terminal at some earlier time.
  note that multiple alert servers may be in possession of a required alert descriptor contemporaneously, in which case the optimum alert server for use in a given call may be a function of the geographic or network location of the called terminal at the time of the call.
(c) information for the called terminal to pass on in unmodified or modified form to alert server(s) to assist said alert server(s) in identifying and providing the alert descriptor(s) appropriate to the incoming call.

Alternatively the information may simply comprise the alert descriptor to be used with the call, in which case steps 3 through 5 of the 'Alert Fetch' call sub-process can be viewed as a single step, and other information such as described above may not be required.

In an alternative embodiment of a system of the present invention using the 'Alert Fetch' call sub-process, a participating called terminal simply assumes that an alert descriptor may be available for a given incoming call. In this embodiment, where CLID (or equivalent for other than telephone calls) is available for an incoming call, the called terminal passes this CLID on to an alert server or servers. The alert server(s) then determine whether an alert is available to be used with the call. Subsequently, the alert server or servers may respond to the called terminal with an alert descriptor where one is available, or in the negative, or otherwise not at all. It can be seen that in this embodiment a customised alert system may be implemented which does not require the active cooperation of the entities which control the call setup.

In a more elaborate embodiment of the present invention, an alert server, upon receipt of an alert descriptor retrieval request may additionally apply logic based on ancillary information to assist in selecting the most appropriate alert descriptor to forward to the called terminal for use with a given incoming call.

The process of alert descriptor retrieval may be as simple as a request of a named file using a known file transfer process, such as the File Transfer Protocol (FTP), or Trivial File Transfer Process (TFTP) or some other suitable process for the transfer of digital information.

In a particular embodiment of the present invention, alert descriptor retrieval may not be required in the event that the called terminal determines that the required alert descriptor already exists locally. This may be because the required alert descriptor was stored in local memory as a result of an earlier call that made use of the same alert descriptor. Alternatively, it may be because the required alert descriptor was loaded into the phone at the time of manufacture or sale, or possibly at some other time.

Preferably, the interpretation and utilisation of an alert descriptor by a called terminal results in the reproduction of an alert corresponding to the alert descriptor (that is, a 'Customised Alert'), utilising the applicable features of a communications terminal as described earlier.

In a preferred embodiment of the present invention, the called terminal may abandon the call sub-process at any stage in accordance with predefined local criteria. In this respect, if the call sub-process has not been completed within a predetermined period of time, the called terminal may instead make use of a default or other locally determined alert to announce the call request. In a particular embodiment of the present invention the called terminal retrieves alert descriptor(s) and retains it (them) in cache memory for possible future use even when it is not able use it (them) in conjunction with the current incoming call, perhaps because of excessive network latency or because the called terminal is busy ('engaged') or because the called party is unavailable ('ring-out') or for some other reason.

While the embodiments of the 'Alert Fetch' call sub-process presented above are suitable for a wide variety of customised alert systems, it is to be understood that many variations of the embodiments presented above are possible depending on the scope, objectives and manner of implementation of a particular customised alert system.

Having described the call sub-process applicable to the "Alert Fetch" sub-process the 'Alert Push' call sub-process will now be described.

According to the inventive method, in a system of the present invention which supports the 'Alert Push' sub-process, a user participating in a customised alert system is able to request a customised alert management system to offer alert descriptors together with identifiers of communications terminals or communications services from which the user expects to originate calls (and optionally ancillary information) to one or more designated communications terminals for said communications terminals to retain for use with future call(s) it/they may receive from said calling user or calling terminals or calling communications services.

In this respect, a difference between the Alert Push sub-process and other sub-processes described hitherto is that with the Alert Push sub-process, the offer of an alert descriptor to a participating communication terminal need not be temporally associated with a call to that communications terminal. Indeed, in one preferred implementation of the Alert Push sub-process, alert descriptors are distributed to designated communications terminals as soon as sufficient information has been provided by the user to the customised alert management system to uniquely distinguish the designated communications terminals.

In a particular implementation of a customised alert system, the Alert Push sub-process is implemented in addition to the 'Alert Fetch' processes. In this way, a participating user can cause his or her customised alerts to be pre-distributed to the communications terminals of frequently called friends or associates and made available on an as required basis to less frequently called numbers.

In one possible implementation of the Alert. Push sub-process, a user could elect to have his/her alert descriptor(s) automatically offered and preferably pre-distributed to each communications terminal corresponding to some or all entries in an address book or local or remote directory associated with the users communications terminal. In this possible implementation, changes to the user's alert service configuration or changes to address book or directory assignments would preferably automatically cause an update to be triggered and new alert descriptor(s) distributed and/or old alert descriptor(s) 'withdrawn'.

Communications terminals which elect to receive alert descriptor(s) so offered then store alert descriptors and associated identifiers and perhaps associated ancillary information in non-volatile memory, ideally using a suitable caching scheme. Subsequent alert processing proceeds in a similar manner to the 'Alert Fetch' sub-process. In this respect, the communications terminal will be able to determine whether it can provide a customised alert for an incoming call by comparing an identifier provided during the call set-up process (such as CLID or some other form of identifier) to the identifiers held in non-volatile memory and associated with alert descriptors and/or ancillary information.

Having described the call process applicable to the 'Alert Push' sub-process other capabilities of present invention will now be described.

In order to overcome limitations which may be imposed on a customised alert system due to network latencies, a particular embodiment of the present invention provides a mode of implementation, herein referred to as 'Use Next Time Mode'. This mode may advantageously be used in combination with embodiments of the present invention which use the 'Alert Fetch' or 'Alert Offer' sub-processes or indeed with other embodiments of the present invention.

With 'Use Next Time' mode, an alert descriptor and associated calling terminal identifier of calling communications service identifiers, once retrieved by a communications terminal, are preferably stored in non-volatile memory for use the next and possibly subsequent times a call is received requiring the same alert descriptor, should such a call or calls be received at some point in the future. It can be seen that the 'Use Next Time' implementation mode may have the beneficial effect of reducing the time taken for alert handling in subsequent calls requiring the alert descriptor.

Thus, a participating terminal is able to collect and store alert descriptors on an ongoing basis in the expectation that at least some of them may be of use in the future. In this respect, because communications terminals have a finite amount of memory available for the storage of alert descriptors, communications terminals which cache alert descriptors (this feature is included but not limited to communications terminals in a system that makes use of "Use Next Time" mode) may implement a scheme that enables alert descriptors of more frequent callers to be retained and alert descriptors of infrequent or one time callers to be eventually discarded. Any appropriate scheme for labelling, indexing and managing of alert descriptors may be used, for example, the caching systems commonly associated with HTTP and the World Wide Web.

Since the present invention provides users with the capability to modify or change their preferred alert(s), preferably at any time, the alert descriptors retained by a communications terminal for future use can become out of date. In this respect, in a preferred embodiment of the invention wherein caching is utilised, cached alert descriptors are able to be updated. An example of a scheme that is useful in the present invention, is a scheme wherein a communications terminal attempts to retrieve the alert descriptor each time it receives a call associated with said alert descriptor, and stores this alert descriptor for use the next time it receives a call requiring said alert descriptor should this occur. Such an arrangement is able to ensure that a cached alert descriptor can never age by more the period between two calls associated with successful retrieval of said alert descriptors.

A system of the present invention which implements caching may also make use of labelled alert descriptors. Broadly speaking, a labelling scheme with wide scope will result in a more efficient implementation because of the increased likelihood that multiple system users will have selected a given labelled alert descriptor. It is to be understood here that the term 'scope' refers to the number of network systems or domains within which a given set of identifiers are valid and recognised.

Even greater efficiencies can be gained in systems of the present invention wherein the protocol for delivery of an alert descriptor to a called terminal is temporally ordered so that the alert descriptor label is sent to the called terminal before the alert descriptor. In this regard, it can be seen that a called terminal which caches labelled alert descriptors can then quickly determine whether it already has a given labelled alert descriptor in cache and make use of that copy of the alert descriptor if it does, thereby obviating the cost and delay associated with obtain a second copy of said alert descriptor.

Having described means of overcoming practical difficulties which may result from excessive network latencies, other capabilities of present invention will now be described.

In order to overcome limitations which may be imposed on a customised alert system by underlying network capabilities, an embodiment of the present invention provides a mode of implementation, herein referred to as 'In Band Alert Dialogue Transport' which allows the alert dialogue to be transported using the voice circuit supporting the call to which the alert is associated. It will be seen that 'In Band Alert Dialogue Transport' may be of particular benefit when a customised alert system is to be implemented in conjunction with a second generation circuit switched mobile network such as GSM.

In a system of the present invention which implements 'In Band Alert Dialogue Transport', part or the entirety of the alert descriptor dialogue associated with a call is transported 'in-band' by means of the voice communications channel that exists between the calling terminal and the called terminal during a call. In a preferred implementation, part or the entirety of the alert descriptor dialogue takes place during pauses in the voice conversation, said pauses being automatically detected by some suitable means, or alternatively or additionally, the alert descriptor dialogue commences after the voice conversation has concluded (as indicated by either the calling or called party pressing the 'end-call' button on their phone), release of the voice channel between calling and called party being temporarily deferred until the alert descriptor dialogue has successfully concluded or abandoned.

In an alternative implementation of 'In Band Alert Dialogue Transport', part or the entirety of the alert descriptor dialogue may be transported 'in-call' using the voice communications channel by interleaving the alert descriptor dialogue with the digital representation of the voice conversation in such a way that the voice quality is degraded by an acceptable amount. This technique may also be beneficially combined with the first mentioned technique.

'In Band Alert Dialogue Transport' may take place between the calling terminal and the called terminal and be transparent to the network participating in the call. Alternatively 'In Band Alert Dialogue Transport' may take place between the called terminal and some other point on the voice circuit between the calling terminal and called terminal whereat injection of digital information is possible—for example in a PLMN scenario, between the called terminal and the MSC to which the called terminal is associated.

It is to be understood that the above mentioned in-band-technique may be used to transport information about the availability of an alert descriptor to a called terminal, and/or the name or number or identifier of an alert descriptor, and/or an alert descriptor and/or any other information whatsoever which may be of use in a customised alert system.

It can seen that 'In Band Alert Dialogue Transport' may be particularly beneficial when implementing a Customised Alert System in a TDM based network such as GSM.

Having described means of overcoming limitations which may be imposed on a customised alert system by underlying network capabilities, other capabilities of present invention will now be described.

In systems of the present invention which implement caching, an embodiment of the present invention, herein referred to as 'Cascade Caching' may be used to further optimise the efficiency and user perceived utility of a customised alert system.

In a system of the present invention which implements 'Cascade Caching', some or all called terminals and some or all alert servers and one or more caching servers participate in a distributed alert descriptor caching scheme, thereby increasing the likelihood on average that a given alert descriptor will be able to be sourced from a source closer in terms of download time than it would be in the absence of such a caching scheme. In this regard, any suitable caching architecture, scheme, system or protocols may be used to implement 'Cascade Caching'.

In a preferred implementation of the present invention, caching is hierarchical and transparent to the called terminal.

In one available implementation of the present invention, 'Cascade Caching' spans multiple customised alert services. It will be seen that this provides performance and roaming benefits to both participating customised alert service providers and their users.

In another available implementation of the present invention, 'Cascade Caching' spans multiple customised alert services, and a common alert descriptor labelling schema is used throughout the shared 'Cascade Caching' system (though not necessarily exclusively). It will be seen that this provides performance and roaming benefits to both participating customised alert service providers and their users.

In a further available implementation of the present invention, 'Cascade Caching' spans multiple customised alert services, and a common alert descriptor labelling schema is used within the shared 'Cascade Caching' system (though not necessarily exclusively) and common alert descriptor dialogue protocols and data formats are used within and among participating customised alert systems (though not necessarily exclusively). It will be seen that this provides significant performance and roaming benefits to both participating customised alert service providers and their users.

Having described means of optimising the efficiency and user perceived utility of a customised alert system by using 'Cascade Caching', other capabilities of present invention will now be described.

In a particular embodiment of the present invention, customised alert system users are able to exercise control over the kinds of customised alerts that they are willing to receive. In this respect, at a minimum, participating terminals preferably allow the customised alert feature to be dynamically enabled or disabled at any time. In a closely related second particular embodiment of the present invention, customised alert system operators may categorise alerts according to the form of their content and tag alert descriptors accordingly so as to allow participating terminals to detect and possibly act upon knowledge of an alert descriptor's category. By way of example, a customised alert system operator may present to its users for selection during the subscription phase a number of 'category 1' alerts, a number of 'category 2' alerts and a number of 'category 3' alerts, wherein 'category 1' includes alerts that the operator considers to be unlikely to be offensive to any recipient in any context—for example, the sound of a train whistle; and wherein 'category 2' includes alerts that the operator considers to be inoffensive under most circumstances, for example, Tarzan's jungle cry, and wherein 'category 3' includes alerts that do not fit into either 'category 1' or 'category 2'. In this regard a user may configure his or her participating terminal so as to always accept 'category 1' alerts, and so as to accept 'category 2' alerts outside of business hours only and when not within certain defined vicinities, and never to accept 'category 3' alerts. In this example, should the operator allow users to upload customised alert descriptors such uploaded alerts may be always automatically designated as 'category 3'.

In a related third preferred embodiment of the present invention, participating terminals are able to be dynamically configured so as to act upon some but not all aspects or components of customised alert descriptors some or all of the time. In this regard, an operator of a participating terminal may indicate by means of a keystroke sequence or menu selection or by some other means that the terminal should for the time being or indefinitely not act upon the audio component of customised alert descriptors but continue to act on other alert descriptor aspects or components such as visual components. As will be appreciated, this feature will be of benefit to a participating terminal operator who either always or for a period of time wishes to have the ability to identify his or her communications terminal by its alert. In a fourth preferred embodiment of the present invention closely related to the third preferred embodiment of the present invention in intent and effect, participating terminals use a pre-defined or user configurable hybrid combination of the called terminal default or user selected alert and customised alert for calls for which a customised alert is available. Further, this is preferably a dynamically configurable option which the participating terminal operator can control. In this regard, in one possible implementation, the participating terminal may commence ringing using the default or terminal user selected alert for a period of time and then change to the customised alert for the duration of the alert announcement period. It will be appreciated that this embodiment provides the called terminal operator with the benefits that derive from having a pseudo-unique alert of their own selection (such as the ability to be able to identify their own phone when it is 'ringing') as well as the benefits that derive from accepting calling partys' preferred alerts (such as the additional information and entertainment value that these provide).

It will be appreciated that the present invention provides a number of different alert descriptor selection and transfer mechanisms which are able to be used by a system using the method of the present invention to distribute the alert descriptors to communications terminals.

BRIEF DESCRIPTION OF THE DRAWINGS

The invention will hereafter be described in greater detail by reference to the attached drawings which show example forms of the invention. It is to be understood that the particularity of those drawings does not supersede the generality of the above description of the invention. In the drawings.

DESCRIPTION OF A PREFERRED EMBODIMENT OF THE INVENTION

The method and system of the present invention will now be described in relation to a preferred embodiment. It is thus to be appreciated that the following description is not to limit the generality of the invention.

The preferred embodiment of the invention describes the use of a customised alert system that can be used in the method and system of the present invention to provide a customised alert service for customised alert system users or subscribers.

Figure 1:
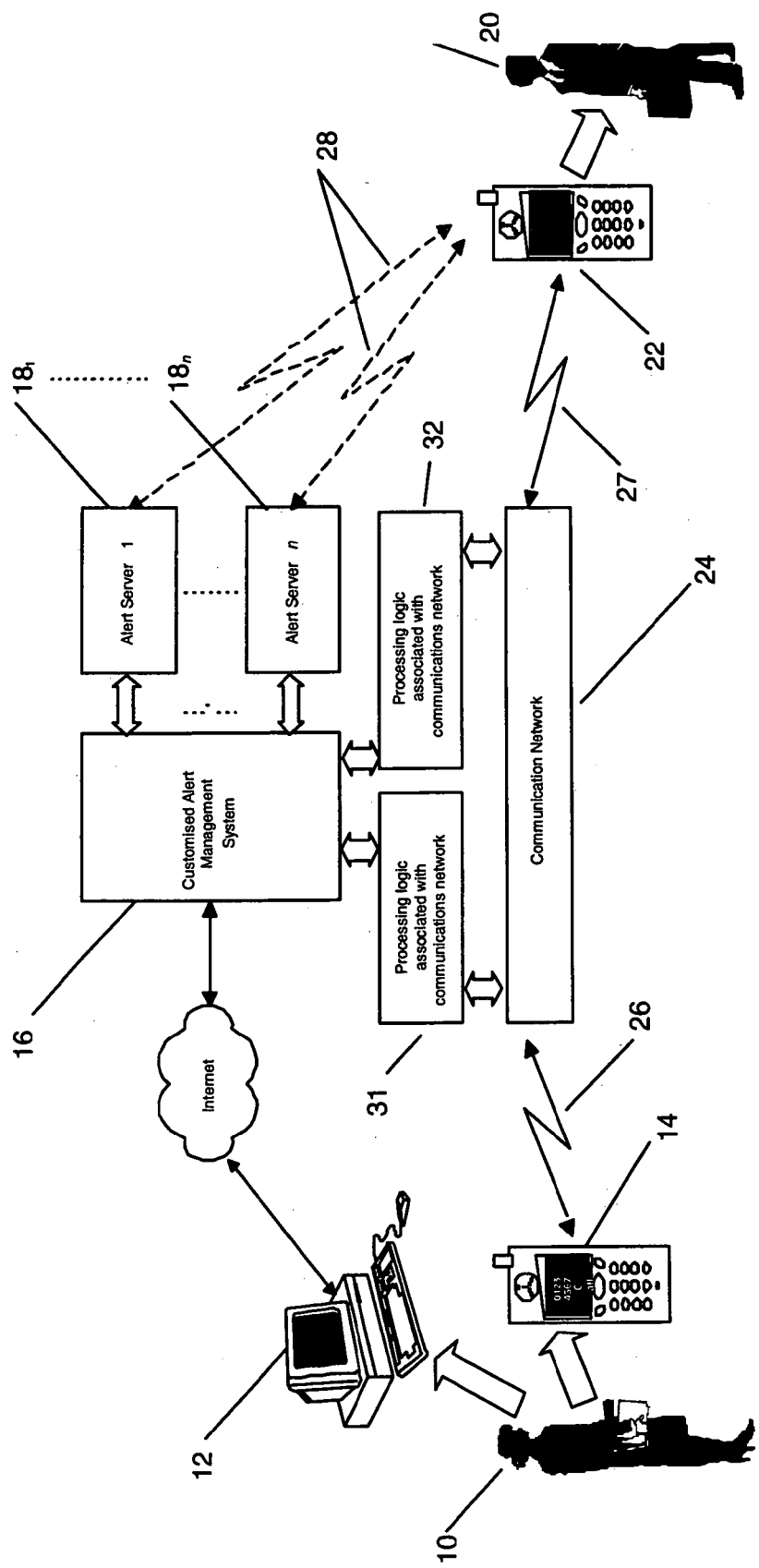
FIG. 1 shows a functional block diagram of a customised alert system in accordance with a preferred embodiment of the present invention.

With reference to FIG. 1, there is illustrated a preferred arrangement of the present invention which utilises a variant of the 'Alert Fetch' call-sub process, as described earlier.

In a system using the inventive method, a user 10 creates a customised alert service using an Internet connected device 12, or a communications terminal 14, to interact with a customised alert management system 16. The creation of a customised alert service preferably involves the user 10 entering user identification information and designating communications services or terminals to which the customised alert service is to be applied (i.e. from which the user expects to originate calls in the future). Preferably, the entered identification information is used by the customised alert management system 16 to validate the identity of the user 10 at this time and on subsequent occasions when the user wishes to access, and perhaps modify, their customised alert service.

Following the creation of a customised alert service, the user 10 may be able to configure their customised alert service by selecting and/or providing an alert descriptor, or alert descriptors, which will preferentially be used to announce calls made to participating communications terminals. The process of selecting and/or providing an alert descriptor(s) may involve the selection of an alert descriptor(s) from alert descriptors presented to the user by the customised alert management system 16. Alternatively, the selection process may involve the selection of alert descriptors from an Internet web-site unrelated to the customised alert management system and the subsequent 'uploading' of the selected alert descriptor(s) to the user's customised alert service.

During the process of configuring their customised alert service the user 10 may be able to select and/or provide ancillary information, in the form of rules, preferences, conditions or instructions, which are preferably used to define when and/or how the selected alert descriptors should be used to announce calls from the user, or from designated communication service(s).

The selected alert descriptors and associated ancillary information are stored on an alert server 18 associated with the customised alert management system 16. In this respect, the customised, alert management system 16 makes sufficient associations between the selected alert descriptors, originating communications terminal identifiers or communications service identifiers and possibly also ancillary information to enable the customised alert management system 16 to perform necessary future functions including, inter-alia and in particular, the distribution of customised alerts to communications terminals. Preferably, the required information is stored in a suitable database(s).

The alert server 18 and the user's communications terminal 14 need not be physically separate entities. Indeed, the communications terminal 14 may incorporate the functionality of an alert server 18, in which case the communications terminal 14 and an alert server 18 may be the same physical device.

Subsequent to the selection of alert descriptor, or alert descriptors, the user 10 is able to utilise the customised alert service. The user 10, uses the communications terminal 14, or Internet connected device 12 with a suitable telecommunications capability (for example, SIP soft phone)) to initiate a call to a called party's 20 communications terminal 22.

An entity participating in the call setup process and associated with the calling terminal or service 31 detects the call set-up request and provides the customised alert management system 16 with the originating communications terminal or service identifier and the called communications terminal or service identifier or some other suitable identifier) which the customised alert management system 16 uses to identify and/or locate and/or retrieve alert descriptor(s) and possibly also ancillary information for use with the call.

In a preferred implementation, terminals or services associated with a customised alert service are so identified by 'flags' within the entity 31 and the entity 31 only signals the customised alert management system in regard to impending calls which are associated with a customised alert service. In this respect, 'flags' are preferably set or re-set by means of a dialogue between the customised alert management system and the entity 31 which takes place at or near to the time a customised alert service is being set up or modified.

In the event that the customised alert management system 16 is unable to locate a customised alert service for use with the call then the call proceeds in the normal manner.

However, in the event that the call is associated with a customised alert service, then the customised alert management system 16 interprets any ancillary information which may be associated with the identified customised alert service and retrieves the customised alert service information, possibly including one or more alert descriptors, for the customised alert service from one or more of alert servers 18. The customised alert management system 16 then provides the retrieved information to an entity participating in the call setup process and associated with the called terminal or service 32.

Some or all of the retrieved information, potentially including customised alert descriptor(s), depending on the particular implementation, is then forwarded by the entity 32 to the called terminal 22 via the communication path 27 or via some other suitable communication path. Preferably the retrieved information is transmitted to the called terminal 22 contemporaneously with and as an a part of or else extension to the call set-up signaling dialogue between the entity 32 and the called terminal 22, which dialogue would have taken place even were this not a call associated with a customised alert.

The extent of the information so retrieved by the customised alert management system 16 and so provided to the entity 32 and thence to the called terminal 22 may vary from system to system in accordance with the design objectives of the particular customised alert system.

In one example of a customised alert system design wherein it is desired that alert processing should largely be under the control of the customised alert management system and entities participating in the call setup process such as 31 and 32, the information so retrieved and so provided to the called terminal 22 may indeed incorporate the customised alert descriptor(s) for the call and perhaps also some or all of the ancillary information should ancillary information exist.

In another example, the information so retrieved by the customised alert management system 16 and so passed on to the called terminal 22 may include information to assist the called terminal 22 in performing alert processing. For example, the retrieved information may include a pseudo-unique label or labels, or other form of identifier, or indeed a fully qualified network address, advantageously in the form of a URL, which may assist the called terminal 22 in identifying and retrieving the correct alert descriptor or descriptors to be used with said call or calling user 10 or calling terminal 14 or calling service. Alternatively or additionally, the retrieved information may be such as to enable, or assist, the called terminal 22 in locating an alert server 18, or alert servers capable of providing the correct alert descriptor or descriptors to be used with the call or calling user 10 or calling terminal 14 or calling service.

If the information provided by the customised alert management system 16 to the called terminal 22 via the communications network 24 contains a network name(s) or address(es) of suggested alert server(s), and possibly also information to enable an alert server 18 to identify and provide the alert descriptor appropriate to this incoming call, then the called terminal 22 may attempt to establish communication with the identified alert server or alert servers 18. In a preferred implementation of a system of this design, communication between the called terminal 22 and alert server(s) 18 may take place over the Internet or an IP based network or packet network or inter-network. Subsequent to establishing communication with the alert server 18, the called terminal 22 preferably requests that the alert server 18 provide the appropriate alert descriptor(s) to the called terminal 22. In this respect, where the information provided by the called terminal 22 to the alert server 18 includes information to assist or enable the alert server 18 to identify the alert descriptor, such information may not be restricted to information which originated from the customised alert management system 16. Indeed, such information may also include additional information which is sourced from the called terminal 22 or by the called terminal 22 from some other location.

The alert server 18 may respond to an alert retrieval request by providing the single available alert descriptor associated with this user's 10 customised alert service should it possess the same. Alternatively, the alert server 18 may apply additional logic based on ancillary information to select the most appropriate alert descriptor associated with this user's 10 customised alert service for use with the call.

The transfer of alert descriptors from the alert server 18 to the called terminal 22 may be accomplished by means of any suitable process or protocol, including, by way of examples only, a Web Service or SOAP or HTTP or FTP or TFTP or Sockets or by means of GSM SMS (Short Message Service) or GSM USSD (Unstructured Supplementary Services Data) Bearer.

In one possible embodiment of the invention, the alert server 18 is physically incorporated within the calling terminal 14, hence the alert dialogue and retrieval process may be accomplished by means of communications between the called terminal 22 and the calling terminal 12.

In the preferred embodiment of the invention, the retrieval of an alert descriptor may not be required if the called terminal 22 determines that the required alert descriptor exists locally (that is, in called terminal 22 local memory). This may be because the required alert descriptor was cached as a result of an alert descriptor fetch associated with an earlier call or call attempt that used the same alert descriptor. Alternatively, it could be because the required alert descriptor was pre-loaded into the called terminal 22 at the time of manufacture, or sale, or at some other time.

If retrieval of an alert descriptor is required and if for whatever reason the alert descriptor is not able to be received by the called terminal 22 within a time period sufficiently short so as to enable it to be of practical use in conjunction with the current incoming call then the called terminal 22 may abandon alert descriptor retrieval. In such an event, the called terminal 22 may announce the current incoming call using some default or locally determined alert.

In the preferred embodiment of the invention, in the situation just described wherein alert descriptor(s) could not be obtained in a timely fashion, or if the called terminal 22 is busy ('engaged'), the alert descriptor retrieval process nevertheless preferably continues to completion and if and when eventually successful the retrieved alert descriptor(s) and ancillary information (if present) and identifiers (if present) are associated with the calling user 10, terminal 14 or service and stored locally by the called terminal 22, preferably in conjunction with a suitable caching system, and may be used for one or more future calls from this calling user 10, or calling terminal 14, or calling service should such calls occur.

For ease of comprehension, FIG. 1 shows both the calling terminal 14 and called terminal 22 as being associated with a single communications network. However it is to be understood that the invention caters for the situation where calling terminal 14 and called terminal 22 are each associated with distinct communications networks, possibly with any number of additional intervening communications networks. It should further be noted that where the calling terminal 14 and called terminal 22 are each associated with distinct communications networks, these may differ in functional type, geographic location and extent, ownership or technology. In this regard, the only requirement is that the totality of networks spanned between calling terminal 14 and called terminal 22 is capable of supporting a meaningful end to end communicative session between the at least two communications terminals. By way of example, the calling terminal 10 may be a POTS terminal associated with a PSTN operator in Chile, while the called terminal 22 may be a GPRS/GSM WAP Mobile phone associated with a wireless network operator in the United Kingdom.

For generality, FIG. 1 shows the entities 31 and 32 as being distinct entities, However it is to be understood that the invention caters for the situation where a single entity (such as a SIP Proxy) may fulfill both roles. In this case obvious simplifications of the alert processing may be made. Further, one or both of the entities 31 and 32 may potentially be integrated with other systems components (e.g. SIP client contained within a communications terminal). Further, it is to be understood that there may be other entities participating in the call setup process which are not actively associated with alert processing.

Figure 2:
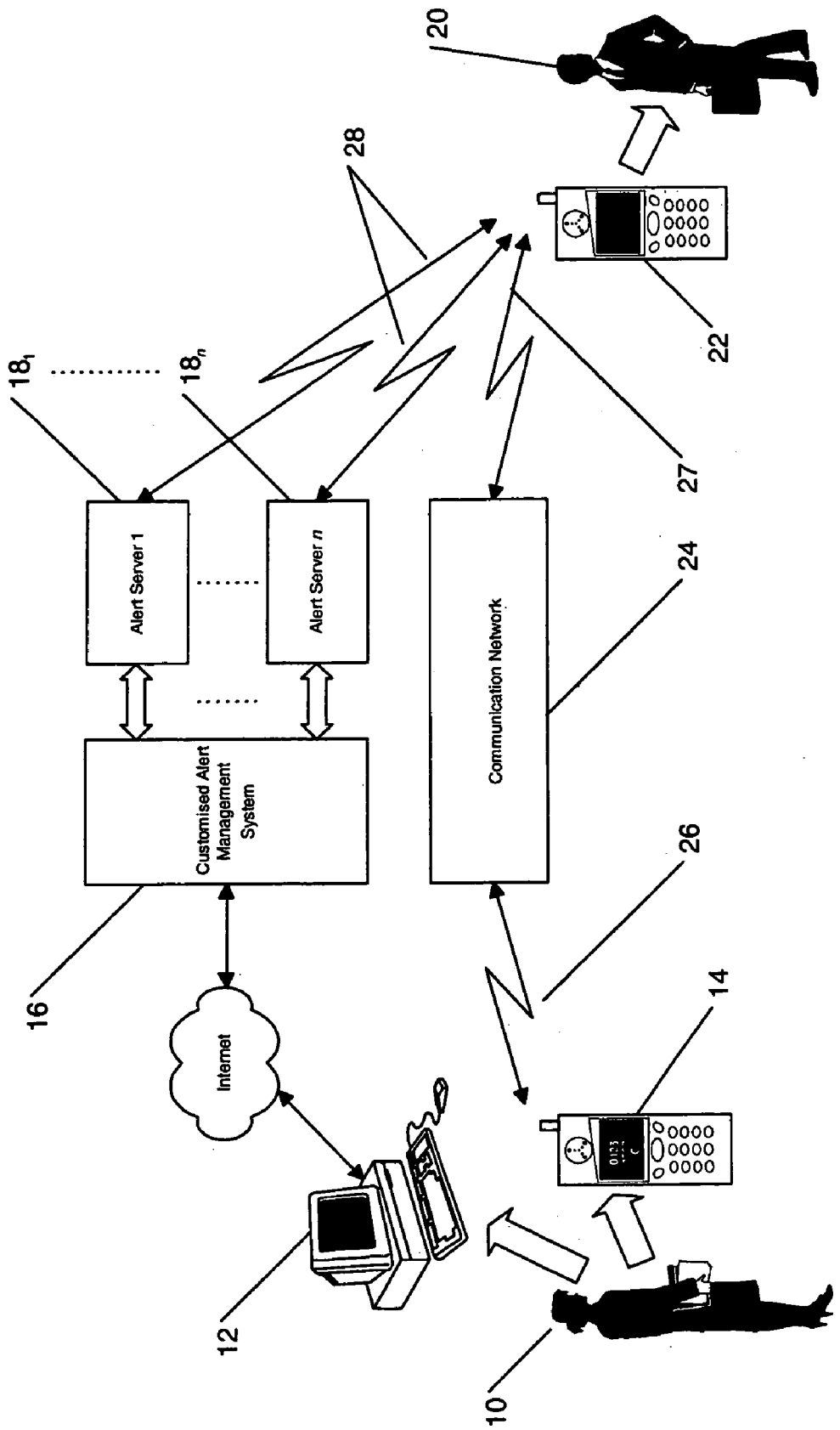
FIG. 2 shows a functional diagram of a customised alert system in accordance with a second embodiment of the present invention.

With reference now to FIG. 2, there is illustrated a second embodiment of the present invention which utilises a variant of the 'Alert Fetch' call-sub process described earlier. According to the second embodiment of the present invention, a user 10 selects alert descriptors for announcing calls to a calling party using same method as that described for the preferred embodiment of the invention.

However, in accordance with the second embodiment of the present invention, a method is provided for distributing alert descriptors to participating communication terminals without the active participation of entities participating in the call setup process.

According to this method, the called terminal 22 assumes that any incoming call for which CLID and/or other suitable identifying information is available may be associated with an alert descriptor. In the case of such a call, during the call set-up process the called terminal 22 passes the CLID and/or other identifying information to an alert server 18 or servers belonging to the same customised alert system as the calling terminal 14 or called terminal 22 as soon as practically possible after receipt of the CLID and/or other suitable identifying information.

Upon receipt of the CLID and/or other identifying information an alert server which finds that it possess the alert descriptor or descriptors associated with the CLID and/or other identifying information, returns the appropriate alert descriptor or alert descriptors to the called terminal 22 as soon as practically. possible.

Hence, in this scenario, the called terminal 22 may be able to retrieve an alert descriptor on the basis of the. CLID provided by the communication network 24.

Where advantageous other features of the first embodiment may be used in conjunction with this second embodiment, for example and in particular, caching and 'use next time' mode.

Figure 3:
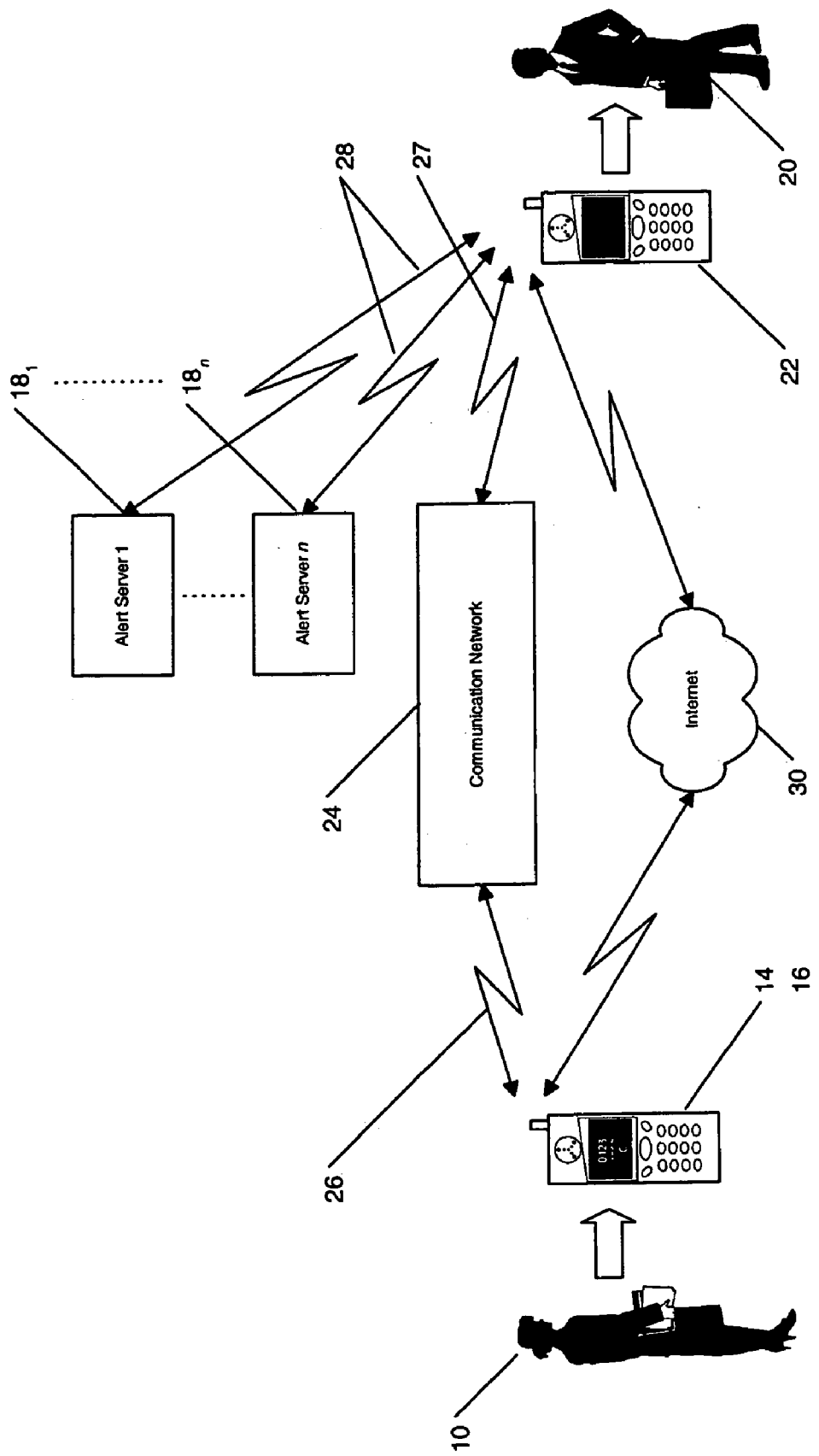
FIG. 3 shows a functional block diagram of the customised alert system in accordance with a third embodiment of the present invention.
Figure 4:
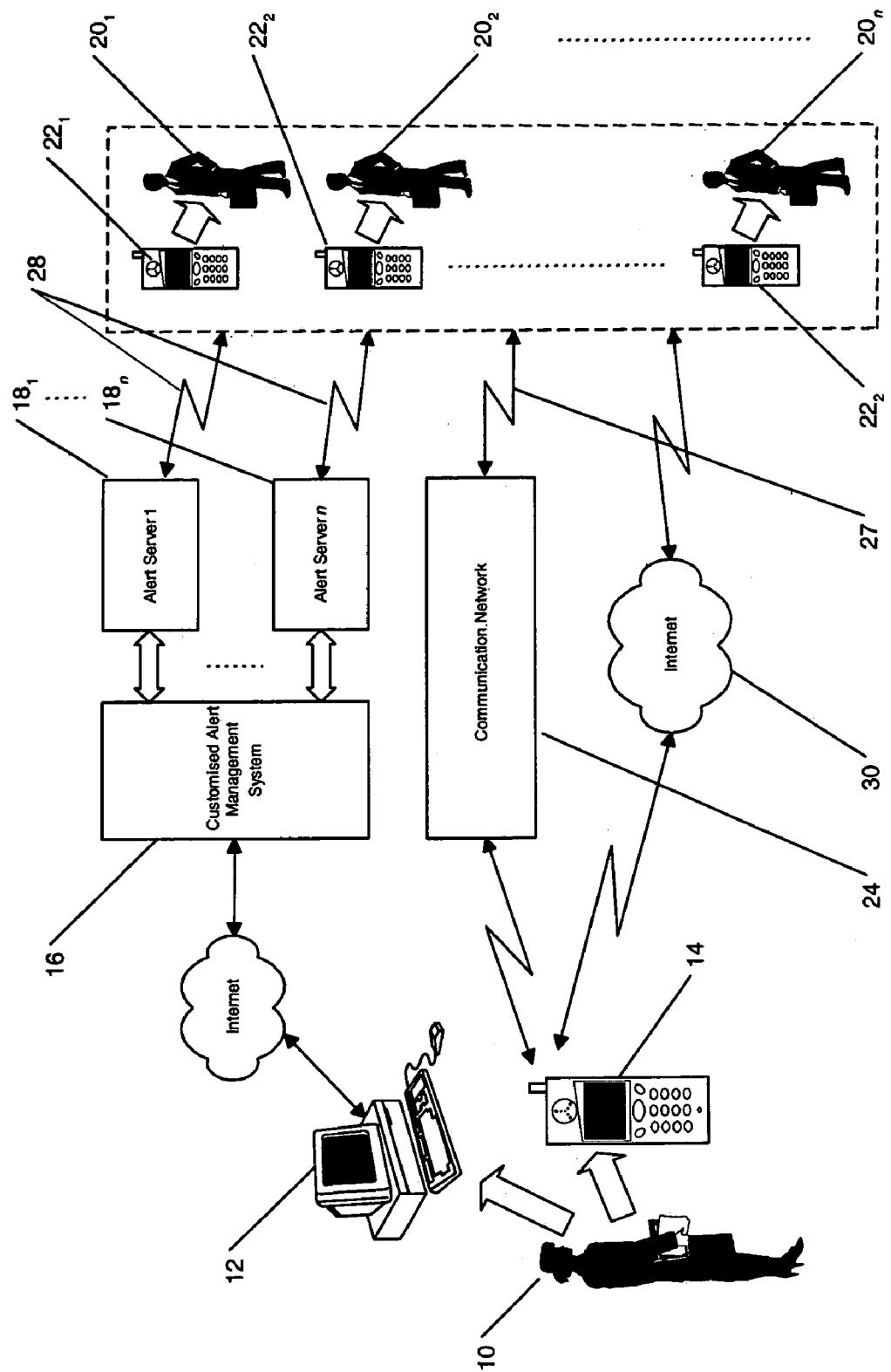
FIG. 4 shows a functional block diagram of a customized alert system in accordance with a fourth embodiment of the present invention.

With reference now to FIG. 3, there is illustrated a third embodiment of the present invention which utilises the 'Alert Push' sub-process described earlier.

According to the third embodiment of the present invention a user 10 selects alerts and configures a customised alert service using the same method as that described for the preferred embodiment of the invention.

However, according to a third embodiment of the present invention, a method is provided for distributing alert descriptors to communications terminals wherein alert descriptor distribution need not be temporally associated with call set-up. In this embodiment, following configuration of a customised alert service by a user 10, alert descriptors and identification information and perhaps associated ancillary information are distributed to one or more communications terminals 22 directly or implicitly identified by a user 10. In this respect, identification information means information, such as an E.164 telephone number, which a communications terminal 22 can store in association with an alert descriptor and later use to correctly associate an incoming call with a customised alert should one exist for the incoming call. Following identification of target communications terminal 22, or terminals, alert descriptors and identification information are offered to identified communications terminal(s) 22 at any suitable time.

Preferably at least one communications terminal 22 accepts the offer, either automatically or possibly with a step involving approval by the user 20, and the alert descriptor and identification information are subsequently transmitted to the communications terminal 22 by any suitable means.

The distribution may be automatic, and may commence at any point in time after the user 10 has indicated which communications terminals should be offered alert descriptors. In this regard, the user need only provide sufficient information to allow system processing logic to identify the network addresses of target communications terminals.

Alternatively, the distribution may be manually triggered. For example, a mobile telephone user 10 may scroll through the phone's address book and indicate through some selection process that his or her alert descriptor or descriptors should be offered to the communications terminal(s) associated with one or more entries in the address book. Distribution may then occur at any later point in time.

Communications terminals 22 which elect to receive alert descriptor(s) so offered receive and store alert descriptors and associated identification information and perhaps associated ancillary information in non-volatile memory, ideally using a database and a suitable caching scheme.

Subsequent alert processing proceeds in a similar manner to the 'Alert Fetch' sub-process. In this respect, the communications terminal 22 preferably determines whether or not it can provide a customised alert for an incoming call by comparing an identifier provided during the call set-up process (such as CLID) to the identification information held in non-volatile memory and associated with alert descriptors and/or ancillary information.

A system of the present invention implementing an automated version of the third method may allow for alerts to be automatically redistributed or 'withdrawn' when a user 10 modifies their customised alert service configuration. Furthermore, a system of the present invention implementing an automated version of the third method may allow for alerts to be automatically re-distributed from time to time to allow for the possibility that target called terminals may have lost copies of alert descriptors, previously distributed.

In a version of any embodiment of the invention which is implicitly though not explicitly illustrated, customised alert management system functionality 16 and alert server functionality 18 may be physically and logically integrated into communications terminals 12, 14, 22 so that there are no physically discrete customised alert management system 16 or alert server(s) 18. This version of the invention, particularly if used in conjunction with CLID, defines a form of customised alert system wherein customised alert system functionality is fully distributed across participating communications terminals and which therefore may be overlaid onto an unmodified communications network(s) 24. Furthermore, in an even simpler version of the invention, a communications terminal which houses a customised alert management system and/or alert server may provide a customised alert service for a single user 10 or communications terminal 14 or communications service.

The present invention is applicable to any communications system or network supporting one-way or two-way communications sessions and which makes use of a call set-up process that includes a step wherein energy is applied to controllable output device(s) or transducer(s) on the called party's communications terminal so as to draw the attention of the called party to an incoming call request.

This includes for example the PSTN/PLMN, public or private SIP based communications systems, teleconferencing systems and networks, video-telephony systems and networks, video-conferencing systems, session based Instant Messaging systems and networks and other current and future forms of communications network which posses the concept of a 'call' or 'communications session'.

Telephone systems are within the scope of the invention and in the case of telephony, the invention may be said to describe systems and processes by means of which the form and nature of the alert used by a Telephone Handset to announce an incoming call request may be remotely specified and controlled so as to allow a person making a telephone call to choose the preferred manner in which their call will be announced to the person or persons they are calling.

A customised alert system as described herein may be implemented as an extension to, or integrated with, or made to advantageously inter-work with an Internet portal or Instant Messaging System such as typified by Yahoo or Yahoo Instant Messenger, AOL or AOL Instant Messenger or ICQ. For example, the customised alert system and the Instant Messaging System could share user interface, user management system, directory, user names or 'handles' etc.

Although a number of embodiments of the method and system of the present invention have been described, it will appreciated that there may be other variations and modifications that may be made to the embodiments described herein that will still also be within the scope of the present invention.

The invention claimed is:

1. A method for selecting the nature or form of an alert used to announce a call made by a user participating in a customised alert service, the method including:
   a. establishing a customised alert service configuration for a participating user, the customised alert service configuration being stored on one or more network accessible devices;
   b. the participating user using a first communications terminal to make a call to a second communications terminal, the first and second communications terminals being remote from the one or more network accessible devices, the call being supported by a first communications service;
   c. the second communications terminal sending a request to one of the one or more network accessible devices, requesting an alert descriptor in accordance with the customised alert service configuration;

d. the network accessible device identifying a chosen alert descriptor using the customised alert service configuration for the participating user;

e. the network accessible device transmitting the chosen alert descriptor to the second communications terminal; and f. the second communications terminal announcing the call by activating an alert using the chosen alert descriptor.

2. A method according to claim 1 wherein establishing the customised alert service configuration includes selecting an alert descriptor from a set of available alert descriptors.

3. A method according to claim 2 wherein the set of selectable alert descriptors is contained on a network accessible device.

4. A method according to claim 1 wherein the customised alert service operates within a network of a plurality of communications terminals and servers, wherein at least some of the communications terminals and servers participate in a caching scheme which allows alert descriptors to be sourced from a plurality of different servers or communications terminals within the network.

5. A method according to claim 1 wherein users who receive calls are able to exercise control over the kinds of customised alerts that they are willing to receive.

6. A method according to claim 5 wherein alerts are categorised according to their nature and/or content, and users who receive calls may choose to receive only particular categories of alerts.

7. A method according to claim 5 wherein a user who receives calls may elect that a call be announced by a combination of two different alerts, one selected by the receiving user and one selected by a calling user.

8. A method according to claim 1 wherein the call is any one of the group of a telephone call, a voice over internet protocol call, a videophone call, a data call, a whiteboard sharing call, an instant messaging session, a multi-user gaming session.

9. A method for selecting the nature or form of an alert used to announce a call made by a user participating in a customised alert service, the method including:

a. establishing a customised alert service configuration for a participating user which includes multiple alert descriptors corresponding to different calling conditions, the customised alert service configuration being stored on one or more network accessible devices;

b. the participating user using a first communications terminal to make a call to a second communications terminal, the call being supported by a first communications service; and c. the second communications terminal announcing the call by activating an alert using a chosen alert descriptor;

d. wherein the chosen alert descriptor is selected from the participating user's multiple alert descriptors according to the customised alert service configuration for the participating user such that different alert descriptors are automaticlaly selected based on the different calling conditions.

10. A method according to claim 9 wherein alert descriptor information is transmitted from one communications terminal to another during the course of a voice call between two or more terminals.

11. A method according to claim 10 wherein the transmission of alert descriptor information occurs:

a. during pauses in voice conversation; or b. after voice conversation has ended; or c. interleaved with voice conversation.

12. A method according to claim 9 wherein the establishing of a customised alert service includes providing information which identifies the participating user or first communications terminal or first communications service.

13. A method according to claim 12 wherein the chosen alert descriptor is chosen according to processing of the identification information.

14. A method according to claim 13 wherein the processing is performed by the second communications terminal.

15. A method according to claim 13 wherein the processing is performed by a server device.

16. A method according to claim 12 wherein the establishing of a customised alert service configuration for a participating user includes selecting and/or providing ancillary information for the participating user.

17. A method according to claim 16 wherein the chosen alert descriptor is chosen according to processing of the ancilliary information and the identification information.

18. A method according to claim 17 wherein the processing of the ancilliary information includes processing variables associated with the ancilliary information, the associated variables selected from:

a. temporal variables;

b. seasonal and cultural variables;

c. geographical variables; proximity variables; and d. personal variables.

19. A method according to claim 9 wherein the chosen alert descriptor is communicated to the second communications terminal from the first communications terminal.

20. A method according to claim 19 wherein the chosen alert descriptor is communicated using the first communication service.

21. A method according to claim 20 wherein the chosen alert descriptor has been communicated to the second communications terminal prior to a call set-up process.

22. A method according to claim 20 wherein the chosen alert descriptor is communicated to the second communications terminal during a call set up process.

23. A method according to claim 20 wherein the chosen alert descriptor is communicated to the second communications terminal asynchronous to a call set up process.

24. A method according to claim 19 wherein the chosen alert descriptor is communicated using a communication path other than the first communication service.

25. A method according to claim 24 wherein the alternative communications path makes use of the Internet.

26. A method according to claim 9 wherein the chosen alert descriptor is communicated to the second communications terminal from a network accessible device.

27. A method for selecting the nature or form of an alert used to announce a call made by a user participating in a customised alert service, the method including:

a. providing a range of alert descriptors available for selection and use by participating users;

b. establishing a customised alert service configuration for a participating user including one or more alert descriptors selected from the available range of alert descriptors, the customised alert service configuration being stored on one or more network accessible devices;

c. the participating user using a first communications terminal to make a call to a second communications terminal, the call being supported by a first communications service; and d. the second communications terminal announcing the call by activating an alert using an alert descriptor chosen in accordance with the customised alert service configuration for the participating user.

28. A method for selecting the nature or form of an alert used to announce a call made by a user participating in a customised alert service, the method including:

a. providing a range of alert descriptors corresponding to different calling conditions, the alert descriptors available for selection and use by participating users;

b. establishing a customised alert service configuration for a participating user including one or more alert descriptors selected from the available range of alert descriptors, the customised alert service configuration being stored on one or more network accessible devices;

c. the participating user using a first communications terminal to make a call to a second communications terminal, the call being supported by a first communications service; and d. the second communications terminal announcing the call by activating an alert using an alert descriptor chosen in accordance with the customised alert service configuration for the participating user such that different alert descriptors are automaticlay selected based on the different calling conditions.

29. A computerised system for enabling the nature or form of an alert used to announce a call made by a user participating in the system to a communications terminal participating in the system to be determined in accordance with the participating user's preferences, including:

a. a plurality of communications terminals, at least some of which are capable of receiving and acting on multiple alert descriptors and calls associated with alert descriptors, the alert descriptors corresponding to different calling conditions;

b. a data entry device for creating a customised alert service for a participating user;

c. configuration software for configuring the participating user's customised alert service, the configuring of the participating user's customised alert service including selecting or providing at least one alert descriptor for use with the participating user's customised alert service;

d. a database for storing the participating user's customised alert service configuration;

e. processing means for choosing an alert descriptor for use with the call made by the participating user to a receiving communications terminal; and f. means of communicating alert descriptors to the receiving communications terminal;

wherein the chosen alert descriptor is selected in accordance with the configuration of the participating user's customised alert service such that different alert descriptors are automatically selected based on the different calling conditions.

30. A system according to claim 29 wherein the processing means is a communications terminal associated with the participating user.

31. A system according to claim 29 wherein the processing means is the receiving communications terminal.

32. A system according to claim 29 wherein the processing means is a server device.

* * * * *